United States Patent [19]

Kuchenrither et al.

[11] Patent Number: 5,519,609
[45] Date of Patent: May 21, 1996

[54] BIOSOLIDS TRACKING SYSTEM

[75] Inventors: Richard D. Kuchenrither, Overland Park, Kans.; Richard P. Byrne, Kansas City, Mo.; Charles D. Leibbrandt, Prairie Village, Kans.

[73] Assignee: Black & Veatch, Kansas City, Mo.

[21] Appl. No.: 268,225

[22] Filed: Jun. 29, 1994

Related U.S. Application Data

[63] Continuation-in-part of Ser. No. 85,616, Jun. 30, 1993, abandoned.

[51] Int. Cl.⁶ .............................. G01V 1/00; G06F 17/10; G06G 7/38; G06G 7/48
[52] U.S. Cl. .................. 364/420; 364/443; 364/449; 364/452; 364/747; 364/751; 405/127; 405/128; 405/129; 342/457; 340/825.49; 395/54
[58] Field of Search ........................ 364/DIG. 10, 420, 364/443, 449, 452; 210/747, 751; 405/127, 128, 129; 342/457; 340/825.49; 395/54

[56] References Cited

U.S. PATENT DOCUMENTS

| | | | |
|---|---|---|---|
| 3,978,673 | 9/1976 | Schleede | 405/128 |
| 3,995,436 | 12/1976 | Diggs | 405/128 |
| 4,229,724 | 10/1980 | Marcus | 340/988 |
| 4,248,548 | 2/1981 | Danford | 405/129 |
| 4,535,335 | 8/1985 | Tagami et al. | 340/995 |
| 4,636,955 | 1/1987 | Ginsburg | 364/420 |
| 4,660,037 | 4/1987 | Nakamura | 340/990 |
| 4,678,911 | 7/1987 | Sundberg et al. | 250/253 |
| 4,796,190 | 1/1989 | Cummings | 364/449 |
| 4,831,539 | 5/1989 | Hagenbuch | 364/449 |
| 4,891,761 | 1/1990 | Gray et al. | 364/452 |
| 4,903,212 | 2/1990 | Yokouchi et al. | 364/449 |
| 4,949,268 | 8/1990 | Nishikawa et al. | 364/449 |
| 4,973,970 | 11/1990 | Reeser | 342/357 |
| 4,977,509 | 12/1990 | Pitchford et al. | 364/449 |
| 4,989,151 | 1/1991 | Nuimura | 364/449 |
| 5,014,206 | 5/1991 | Scribner et al. | 364/449 |
| 5,119,102 | 6/1992 | Barnard | 342/357 |
| 5,124,915 | 6/1992 | Krenzel | 364/420 |
| 5,150,295 | 9/1992 | Mattingly | 364/420 |
| 5,161,886 | 11/1992 | De Jong et al. | 364/449 |
| 5,166,789 | 11/1992 | Myrick | 362/391 |
| 5,241,671 | 8/1993 | Reed et al. | 395/600 |

OTHER PUBLICATIONS

*DataPro Directory*, software description of "Crop Simulation System", created Oct. 1987.
*Soil Science and Plant Nutrition*, vol. 37, No. 2, 1991, pp. 313–322 (abstract only), Yasuda, "Structure and Function of a Computer system for Soil Diagnosis".
*Myforest*, vol. 24, No. 4, 1988, pp. 259–264 (abstract only), Ashbindu Singh, "Geographic information system for wastelands planning development".
*Data Sources*, copy right 1989 by Computer Associates International, Inc., Garden City, NY, Software 1st Edition, vol. 2 (1990), pp. J–65 to J–72.
*PTS Newsletter Database*, Nov. 21, 1991, vol. 1, No. 4, "Govt. Uses of GIS Up, Growth Attributed to GPS".
*Second Ntl Spec Conf Civ Eng Appl Remote Sens Geogr If Syst.*, published by ASCE, New York, NY, pp. 1–8 (abstract (List continued on next page.)

*Primary Examiner*—Gail O. Hayes
*Assistant Examiner*—Felicia Ives
*Attorney, Agent, or Firm*—Hovey, Williams, Timmons, & Collins

[57] ABSTRACT

A biosolids tracking system monitors the quantity and quality of biosolids deposited on a plot of land. Global positioning system technology is used to determine the land coordinates of the boundary of the plot of land for accurate area calculation in order to determine the loading per unit area of biosolids including metals deposited on the plot. The system includes the ability to display superposed topographic and digitized photographic imagery of the plot with textual annotation.

40 Claims, 3 Drawing Sheets

Microfiche Appendix Included
(188 Microfiche, 38 Pages)

OTHER PUBLICATIONS only), 1991, Gyulavary et al., "Building a geographic information system (GIS) for siting New York City Sludge management facilities".

*Applied Eng. in Agriculture*, vol. 7, No. 6, Nov. 1991, pp. 692–698 (abstract only), Heatwole et al., "Targeting animal waste pollution potential using a geographic information system".

*Geo Info Systems*, vol. 2, No. 7., Jul./Aug. 1992, pp. 36–40 (abstract only), Christy, "Managing Agricultural Chemical Use to Protect Groundwater".

*Hazardous Waste: Detection, Control, Treatment. Part B*, pp. 1151–1160 (abstract only), 1988, World Conf. on Hazardous Waste, Budapest Hungary, 25–31 Oct. 1987, von Braun, "Use of geographic information systems for assessing human exposure to organic compounds in a drinking water supply".

*ASEE Annual Conf. Proceedings 1985*, vol. 2, published by ASEE, Washington DC, pp. 733–740 (abstract only), von Braun "Demonstration of a Geographics Information System for Hazardous Waste Site Analyses".

7th Conference on Municipal and Industrial Waste Research and Practice, 1984, Ilittle, "Implementing Ontario's Guidelines for Using Municipal Sewage Sludge in Agriculture", pp. 76–99.

*Soil Science and Plant Nutrition*, vol. 37, No. 2, 1991, Yasuda, "Structure and Function of a Computer System for Soil Diagnosis", pp. 313–322.

*PR Newswire*, Mar. 20, 1989, "LLRWMA identifies candidate areas for waste facility".

Sampling Problems for the Chemical Analysis of Sludge, Soils and Plants, Elsevier Science Publishing Co., New York, 1986, pp. 18–26, Harkness, "Sampling and Analysis of Sludges and Soilds in England and Wales for the Management of Agricultural Utilization of Sewage Sludge".

*Water Resources*, vol. 18, No. 3, 1984, pp. 355–360, Berthouex et al., "Data Management for Land Disposal of Liquid Sludge".

Land qualities in space and time, Pudoc Wageningen publishers, 1989, Robert, "Land Evaluation at Farm Level Using Soil Survey Information Systems", pp. 299–311.

World Conference on Hazardous Waste, 1988, pp. 1151–1160, von Braun, "Use of Geographic Information Systems for Assessing Human exposure to Organic Compounds in a Drinking Water Supply".

Computers in agricultural extension programs: Proceedings of the 4th International Conference, 28–31 Jan. 1992, Orlando, Florida, McCauley et al., "Simulating Spatial Fertilizer Applications in Cotton Production", pp. 159–164.

BIOSOLIDS TRACKING SYSTEM

This application is a continuation in part of application Ser. No. 08/085,616, filed Jun. 30, 1993 and now abandoned.

MICROFICHE APPENDIX

A Microfiche Appendix presents a computer program that demonstrates various control aspects for the operational processes of the tracking system, as described herein. This Appendix is captioned "Appendix; Submission of Computer Program Listing in Application for U.S. Letters Patent: BIOSOLIDS TRACKING SYSTEM, and it contains 38 jackets (sheets) with 188 total chambers (frames).

BACKGROUND OF THE INVENTION

1. Field of the Invention

The present invention concerns the field of sludge disposal from sewage treatment plants. In particular, the system hereof accurately determines the biosolid loading on a plot of land used as a disposal site.

2. Description of the Prior Art

Publicly owned treatment works for treating sewage generate considerable quantities of biosolids in the form of sludge requiring many sites for disposal. The biosolids are usually deposited on farmland as disposal sites because the biosolids are rich in organic matter and other plant nutrients such as nitrogen, phosphorus and potassium, and provide a very beneficial way to improve the land for farming. The biosolids, however, also contain various metals and regulatory authorities place limits on the amounts of the metals that may be deposited on a site. Additionally, the amount of biosolids deposition must also be limited for nitrogen, phosphorus and potassium so that allowable levels are not exceeded for the next crop to be grown on the site. As regulatory authorities demand higher levels of accuracy and reporting concerning the quantity and quality of the biosolids disposal, the administrative requirements have become burdensome, expensive, and in some cases, unmanageable.

One source of problems has been the lack of accurate land coordinates of the disposal sites for precisely locating the sites so that disposal does not occur within regulated minimum distances from a land features such as wells, dwellings and bodies of water. Furthermore, accurate coordinates are required for precisely determining the area of the site so that biosolids loading can be accurately calculated on a per unit basis.

In the prior art, disposal operators have used topographic maps to draw by hand the boundaries of a site based on approximations and to locate various land features. A planimeter has been used to determine the area of the site. As those skilled in the art of cartography appreciate, these techniques lead to substantial inaccuracies, but no practical alternatives have been available.

SUMMARY OF THE INVENTION

The present invention solves the prior art problems discussed above and provides a distinct advance in the state of the art. More particularly, the tracking system hereof provides for accurate, convenient and economical tracking, reporting and management of biosolids disposal.

In the preferred embodiment, the present invention uses global positioning system (GPS) receivers for accurately providing land coordinate data concerning plots of land used as disposal sites as input to a computer. The application software in the computer then determines the plot area. Other inputs include the quantity of biosolids deposited on each disposal site along with quality analyses of the various biosolids constituents for determining the cumulative quantities of these constituents per unit area.

In preferred forms, digital topographic maps of site areas, stored in the computer memory, are superimposed over late-date digital satellite or digitized aeriel photographic imagery of the same site areas for possible updating of the topographic maps to reflect recent changes such as the addition or modification of transportation routes, hydrography and built-up areas. A unique interface allows efficient interaction between the graphics data and textual data. In this way, a map of the site can be retrieved in response to retrieval of the textual data concerning the site. Similarly, when a site map is displayed, the interface allows retrieval of the appropriate textual data for that site.

DETAILED DESCRIPTION OF THE PREFERRED EMBODIMENT

Figure 1:
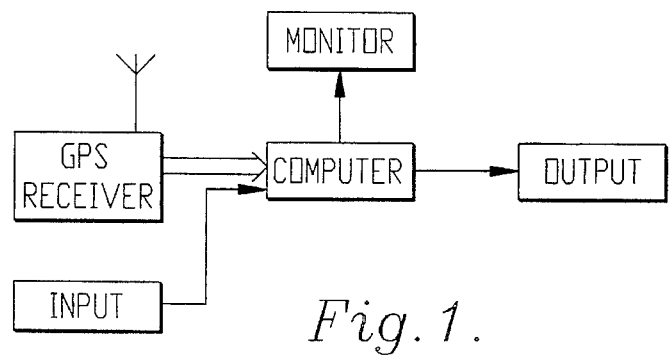
FIG. 1 is a schematic representation of the preferred apparatus in accordance with the present invention.

As illustrated in FIG. 1, preferred biosolids tracking apparatus 10 includes IBM compatible personal computer 12 (486 microprocessor, 33 MHz) having 200 megabyte hard drive memory with a Trident video card with 20 megabytes of RAM for driving a 16 inch color VGA monitor 14. Input 16 is preferably a conventional keyboard and output 18 is preferably a laser printer. Apparatus 10 also receives input information from global positioning system (GPS) receiver 20 such as that available from Garmin Corporation of Lenexa, Kans.

Figure 2:
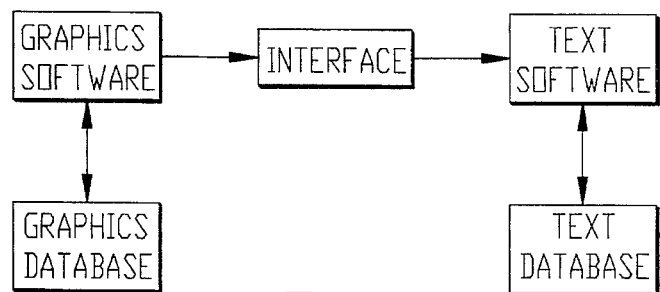
FIG. 2 is a schematic representation of the relationships among the operating programs and databases used in the operation of the computer of FIG. 1.

FIG. 2 illustrates the relationships among the programs and databases used to operate computer 12. Graphics database 22 stores map information created by the user or received in digitized form from other sources. These other sources include the United States Geological Survey providing digitized maps and digitized satellite photographic images known as SPOTView 7.5 Imagery or SPOTView Full Scene.

Graphics software 24 includes AutoCAD release 12.0 available from AutoDesk for creating, displaying and modifying maps and other graphics entities on monitor 14. Graphics software 24 also includes ArcCAD version 11.2 available from Environmental Systems Research Institute used as an interface between AutoCAD and graphics database 22 in which graphics information is stored in a database format instead of a graphics file. CAD Overlay GS (or GSX) available from Image System Technologies is also included in graphics software 24 to display and manipulate digital satellite imagery under a geographical survey map image.

Database 26 stores textual information and is managed by text software 28, preferably PC Oracle available from Oracle Corporation. Interface 30 (shown on the microfiche appendix incorporated herein) is unique software created for allowing on-line interaction between the graphics components 22, 24 and the textual components 26, 28.

Figure 3:
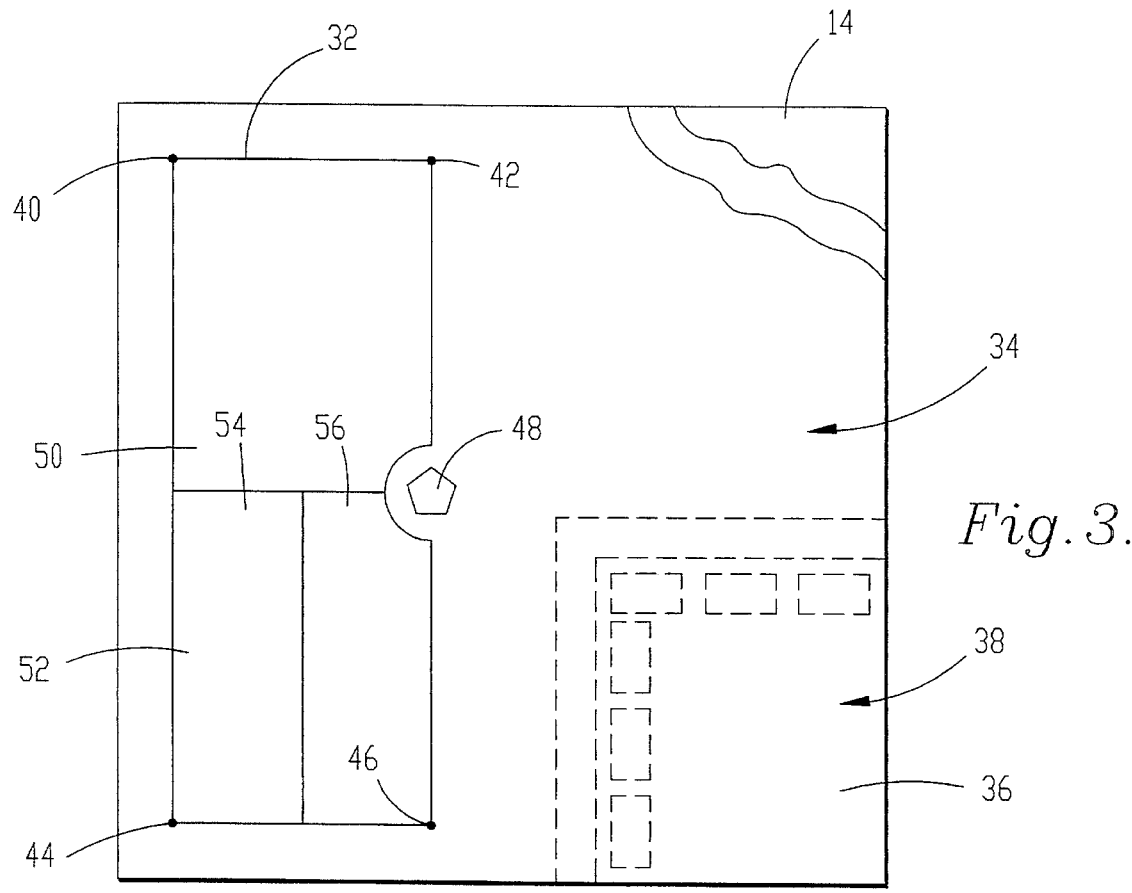
FIG. 3 is an illustration of a map presented on the display of FIG. 1 with a digitized satellite photograph superposed and shown in dashed lines.

In operation, graphics software 24 is used to retrieve and display a combination of digital topographic map data and satellite imagery for a specific area from database 22. For example, FIG. 3 illustrates a display on monitor 14 showing a digital topographic map 32 of site 34 with satellite photographic image 36 shown in dashed lines and superposed on map 32.

As those skilled in the art of cartography can appreciate, topographic survey maps show considerable detail but are often based on information many years old. As a result, these maps may not reflect recent man-made structures. In order to ensure accurate information, apparatus 10 allows superposing of an image of a satellite photograph of the same site and to the same scale. Such photographic images can be updated as often as monthly. As illustrated in FIG. 3, satellite image 36 reveals housing addition 38, not shown originally on map 32. Graphics software 24 can then be used to redraw or trace these new features onto map 32 to reflect accurately the current status of the site.

When a new biosolids disposal location is initially developed, such as site 34, it is necessary to first define the plot by identifying various points about the boundary of the plot of land. In the case of site 34, this is accomplished by identifying the corners 40, 42, 44 and 46. In the preferred embodiment, the identification is conducted in the field using GPS receiver 20, which receives signals from a GPS satellite and, in response, determines the land coordinates in terms of latitude and longitude of each of corners 40, 42, 44 and 46. GPS receiver 20 is also used to determine the coordinates of other land features of interest such as well 48. Land feature information is necessary because various regulations prohibit deposition of biosolids within predetermined minimum distances of such land features as wells, dwellings and bodies of water.

As those skilled in the art will appreciate, initial coordinate data is accurate within about 100 meters. To improve this accuracy, the data is sent by way of a modem to a GPS base station for correction. The corrected data within an accuracy of about one meter is returned and stored. More particularly, the corrected coordinate data concerning corners 40–46 and well 48 are entered and stored in the memory of computer 12. Graphics software 24 then retrieves topographic map 32 from graphics database 22 and precisely draws the boundary of site 34 using the coordinate data.

As illustrated in FIG. 3, well 48 is also shown with the location precisely known from the coordinates. The rightmost boundary of site 34 can be reconfigured as shown to provide a disposal free radius as required by regulations. The display of housing addition 38 also provides assurance that the boundary of site 34 is not within the minimum distance.

As can be appreciated, site 34 may present a large area and it may be desirable to subdivide site 34 into fields 50 and 52. As illustrated, field 52 is further subdivided into tracts 54 and 56. Typically, the subdividing is configured so that a disposal plot corresponds to the land for a particular crop, which governs the amount of biosolids deposition so that desireable nutrient levels are not exceeded.

After plotting fields 50, 52 and tracts 54, 56, the corner coordinates of these subdivisions can be determined directly from map 32. Using this information along with GPS receiver 20, the corners of these subdivisions can be marked in the field with stakes or the like so that the biosolids disposal can be confined to the designated plot. Further, stakes can be used to define the irregular portion of the boundary about site 34 near well 48 or any other land feature of interest. With the sites, fields and tracts precisely defined using land coordinates, the area of each plot can also be accurately determined in computer 12 using functions available in the ArcCAD software.

When site 34 is initially developed, other information is also entered into computer 12 using the keyboard of input 16. This information includes analysis of current soil conditions for each plot including plant nutrients and metals, the land owner, current occupant and lease holder, if any, a physical description of the plot, and the crop to be planted on the plot. In the preferred embodiment, the metals to be tracked include arsenic, cadmium, chromium, copper, mercury, molybdenum, nickel, lead and others.

From the current soil analysis and target yield for the intended crop, computer 12 then determines the limits and target applications for plant nutrients such as phosphorus, nitrogen and potassium. This ensures that safe limits for that crop are not exceeded. As can be appreciated, a portion of these plant nutrients carry over from year to year and the carry over amount is calculated in computer 12 for use in subsequent years so that the allowable limits are not exceeded.

Similarly, the existing metals in the soil and allowable limits for the metals are also known. Using this information, computer 12 calculates the cumulative amount of metals so that the regulatory limits are not exceeded.

During operation, laboratory analyses of selected constituents including the plant nutrients, metals, and percent solids are produced on an ongoing basis. In the preferred embodiment, computer 12 is coupled for data transmission with the laboratory so that the most recent analyses are received and stored automatically.

When biosolids are loaded on a vehicle for transport to a disposal site, the net weight and designated disposal tract are entered into computer 12. In the preferred embodiment, the net weight of the transport vehicle is entered electronically into computer 12 directly from the scale. In addition, the vehicle includes a barcode readable by a laser scanner, for example, that identifies the vehicle in association with the weight, hauler and destination.

In most cases the laboratory analysis of the biosolids loads will already be known and entered into computer 12. In other cases, this information may be entered later. By using the laboratory analysis, including a percent solids, the net weight, and the identity and area of the tract, computer 12 determines the cumulative quantity per unit area of the constituents deposited.

In this way, the status of every site is known on a constantly updated basis. This status includes the number of loads deposited on the plot, the wet and dry quantity, the quality of every load, and the cumulative load on a per unit area basis. With this information readily available, reports can be easily designed and produced using text software 28 in the formats required for all of the regulatory agencies and for internal management as well.

Interface 30 allows the user to quickly move between graphics and textual displays. When site 32 is being viewed on monitor 14 as illustrated in FIG. 3, graphics software 24 is using the information in graphics database 22 to produce the image. If textual information is needed concerning the current metals deposition on tract 54, for example, interface 30 provides the proper interaction with text software 28 to retrieve and display the requested information specifically for tract 54 from text database 26. Similarly, if textual information is being viewed concerning tract 56 and it is desired to view the corresponding map, interface 30 provides the proper commands for graphics software 24 to retrieve and display the appropriate map from graphics database 22.

Overlap Tracking

FIGS. 4A–7B illustrate the concept of the present invention for tracking biosolids loading on field 58 over time as tract boundaries change and overlap with previous tracts. A tract is an actual land area used for biosolids application and typically is associated with an individual crop during a growing season. Tracts may change boundary conditions over time. A season is a period of time defined by the user corresponding to a crop growing season, an application season, changing typographic conditions, or other time frame found useful in managing a land application program. Thus, a season could extend over many years.

Figure 4A:
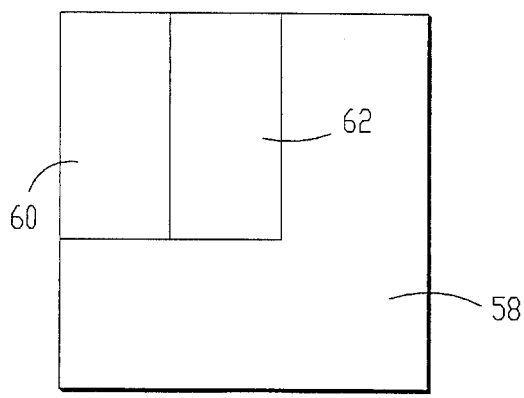
FIG. 4A is an illustration of a map showing tracts in a field for distribution of biosolids.
Figure 4B:
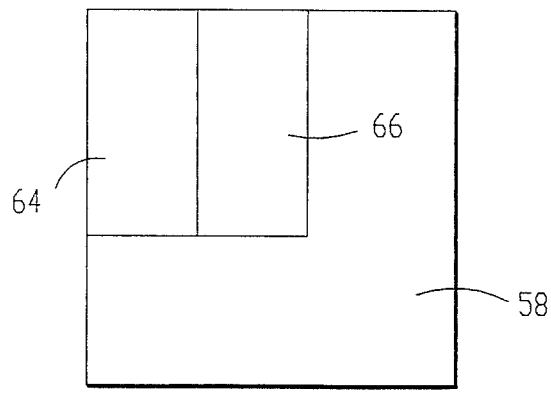
FIG. 4B illustrates polygons associated with the tracts of 4A for tracking biosolids loading.

FIG. 4A illustrates a display of field 58 having tracts 60 and 62 with the boundaries illustrated. For tracking biosolids loading, each tract is defined as the combination of one or more polygons which in turn are determined in the software (database 26 as managed by text software 28) of computer 12 and stored therein. The software determines the polygon boundaries as the superposition of all of the tract boundaries historically defined in the area of interest including the present season. Normally, the polygons themselves are not displayed but are tracked and maintained even when tracts have been deleted or changed. The polygons are used as the basis for accurately tracking the cumulative loading of biosolids. For a given tract, the biosolids loading corresponds to the cumulative biosolids loading for each polygon making up the tract and the loading for each polygon is the sum of the loading of all tracts that have included that polygon. For example, FIG. 4B illustrates polygons 64 and 65 which are defined as corresponding to tracts 60 and 62.

Figure 5A:
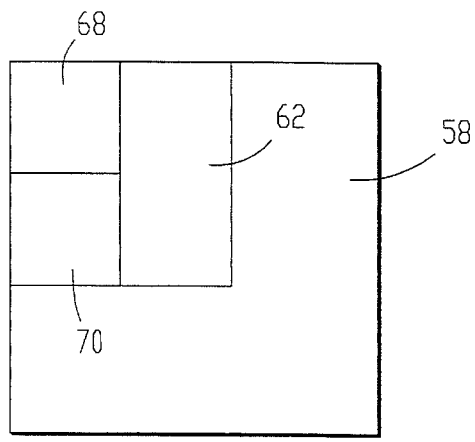
FIG. 5A is an illustration of a map showing a change in tracts of FIG. 4A.
Figure 5B:
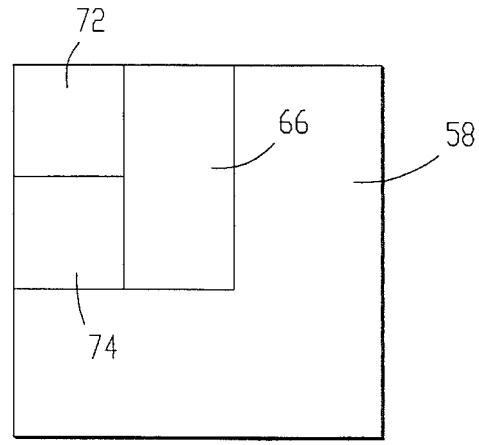
FIG. 5B illustrates polygons associated with the tracts of FIG. 5A for tracking biosolids loading.

FIG. 5A illustrates a subsequent season in which tract 60 has been sub-divided into tracts 68 and 70, with tract 62 remaining the same. With this new tract definition, new polygons 72 and 74 shown in FIG. 5B are defined as respectively corresponding to new tracts 68, 70.

Figure 6A:
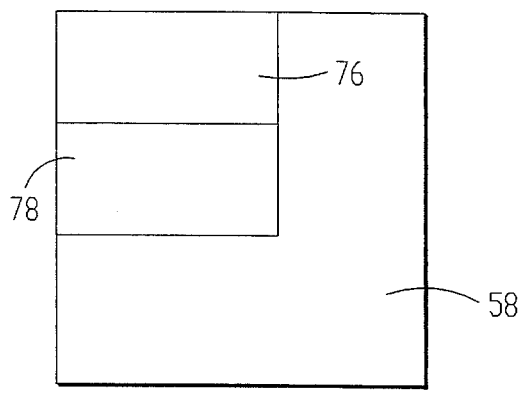
FIG. 6A is an illustration of a map showing a change in the tracts of FIG. 5A.
Figure 6B:
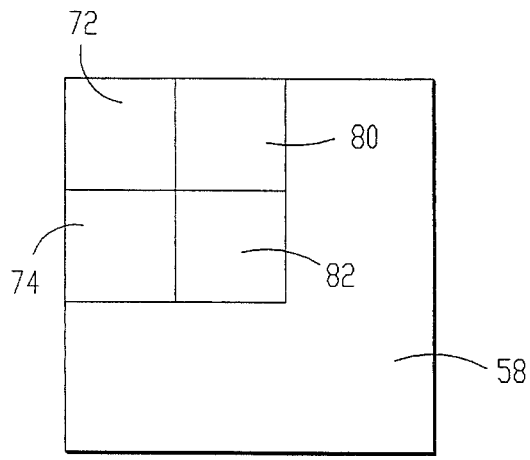
FIG. 6B illustrates polygons associated with the tracts of FIG. 6A for tracking biosolids loading.

FIG. 6A illustrates a third season in which new tracts 76 and 78 have been defined for biosolids distribution. In response, new polygons 80 and 82 (FIG. 6B) are created from old polygon 66. With this change, tract 76 is defined as the combination of polygons 72 and 80. Similarly, tract 78 is defined as the combination of polygons 74 and 82.

Figure 7A:
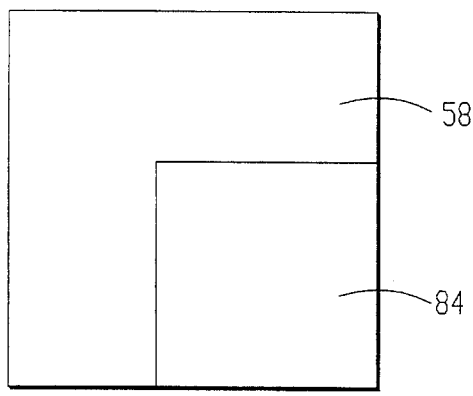
FIG. 7A is an illustration of a map showing a change in the tracts of FIG. 6A.
Figure 7B:
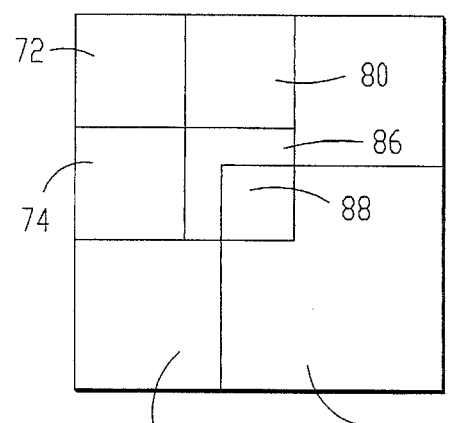
FIG. 7B illustrates polygons associated with the tract of FIG. 7A.

FIG. 7A illustrates the fourth season in which old tracts 76 and 78 have been deleted (taken but of service) and new tract 84 has been defined in the lower right corner of field 58. In this situation, the upper left corner of new tract 84 overlaps a portion of old tracts 62 and 78. In order to track the biosolids loading, computer 12 defines new polygons 86, 88 and 90. As will be noted in FIG. 7B, polygons 86 and 88 correspond to old polygon 82, and the boundaries of all of the polygons illustrated in FIG. 7B correspond to the superposition of all of the boundaries of all of the tracts historically defined on field 58 including the present season.

Polygon 88 is the overlap area of tract 84 (FIG. 7A), tract 78 (FIG. 6A) and tract 62 (FIG. 4A). In order to determine accurately the biosolids loading on tract 84, it is necessary to add the biosolids loading of all of the tracts that have any polygon in common with tract 84. Polygon 88 is common to tracts 84, 78 and 62. Thus, the biosolids loading for that portion of tract 84 corresponding to polygon 88 is the sum of all of the loading for tracts 84, 78 and 62. Biosolids loading for the remaining portion of tract 84 is the loading for that tract only.

In the preferred embodiment, the graphical display of the biosolids loading of tract 84 would be illustrated by showing polygons 88 and 90 in different colors, for example, or by polygon boundary lines. Normally, however, only the current tracts are shown in the graphical display with the polygons being hidden and tracked in the memory of computer 12. The polygon tracking is maintained even when the user deletes a tract from the current disposal scheme.

Setback Tracking

Figure 8A:
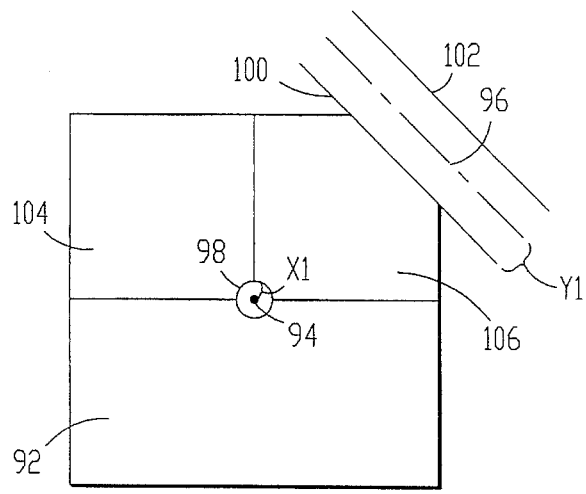
FIG. 8A is an illustration of a map showing tracts for distribution of biosolids subject to setback from a well and a stream.

FIGS. 8A–9B illustrate the use of polygons in tracking biosolids loading for tract boundaries that change because of a change in the setback requirement with regard to wells, streams and other land features that require a setback. For example, FIG. 8A illustrates a map display for field 92 having well 94 in the center and stream 96 running therethrough. For the season illustrated, well 94 requires a setback X1 from the center and stream 96 requires a setback Y1. These setbacks define boundary 98 for well 94 and the boundaries 100 and 102 parallel to stream 96. Well boundary 98 defines a portion of the boundaries of tracts 104 and 106, and stream boundary 100 forms a portion of the boundary of tract 106 as illustrated.

Figure 8B:
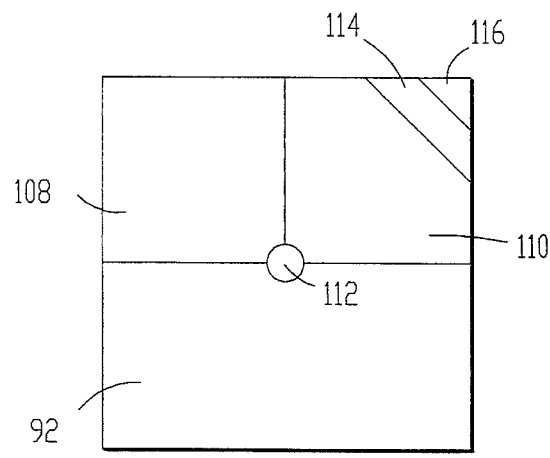
FIG. 8B illustrates polygons associated with the tracts of FIG. 8A.

FIG. 8B illustrates polygons 108 and 110 corresponding to tracts 104 and 106 respectively. Other polygons are also defined including polygon 112 for the area defined by well boundary 98, polygon 114 for the area between stream 96 and stream boundary 100, and polygon 116 for the area between stream 96 and stream boundary 102.

Figure 9A:
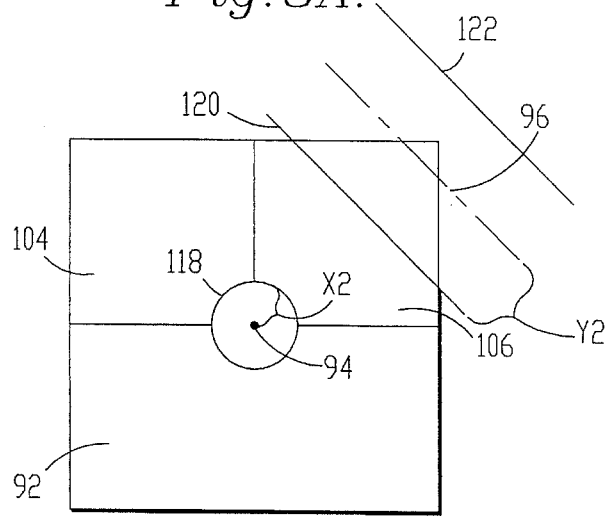
FIG. 9A is an illustration of a map showing a change in the tracts of FIG. 8A because of a change in the setback distance.

FIG. 9A represents a situation in which the areas of tracts 104 and 106 have been changed because of an increase in the setback distance required by regulations. More particularly, the setback distance for well 94 has increased to X2 defining circular boundary 118, and the setback distance for stream 96 has increased to Y2 defining boundaries 120 and 122 on either side thereof.

Figure 9B:
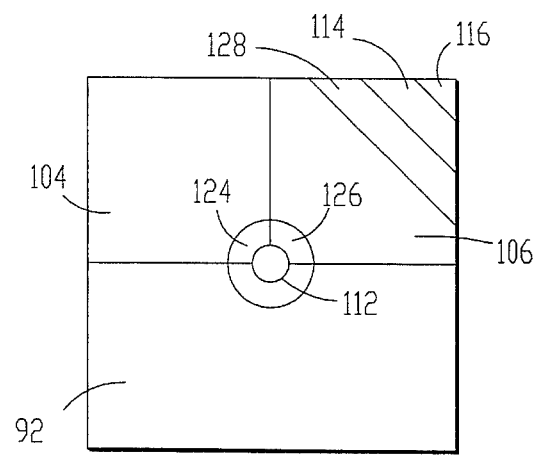
FIG. 9B illustrates polygons associated with the tracts of FIG. 9A.

Because of the setback changes, the polygons for field 92 are also redefined as illustrated in FIG. 9B. New well boundary 118 defines new polygons 124 and 126, and new stream boundary 120 defines new polygon 128. (A new polygon adjacent boundary 122 is not defined because this new area is outside field 92.) It will be noted in FIG. 9B that old polygons 112, 114 and 116 remain so that historical loading data can be tracked even though tracts 104 and 106 no longer include these polygons.

As those skilled in the art will appreciate, the present invention can be used to track disposal of a wide variety of waste matter including hazardous wastes, chemicals, contaminated soil and the like, and other types of bio-solids such as waste water solids and solid waste for landfill disposal.

Having thus described the preferred embodiment of the present invention, the following is claimed as new and desired to be secured by Letters Patent:

1. A method of tracking the intentional depositing of vehicle-transported sewage sludge on plots of land comprising the steps of:
    (a) storing in the memory of a computer boundary information identifying the respective plot boundaries of a plurality of plots of land;
    (b) using said boundary information in the computer for determining a plurality of polygons defined by the superposition of said plot boundaries so that each of said plots includes at least one of said polygons and, so that, if one of said plots overlaps another of said plots, then said one of said plots includes at least two of said polygons;
    (c) determining in said computer the area of each of said polygons using said boundary information;
    (d) storing in said computer memory quantity data representative of the quantity of sewage sludge deposited on said plots and analysis data representative of selected constituents including at least one of metals and nutrients of the sewage sludge deposited on said plots; and
    (e) determining in said computer the cumulative quantity per unit area of said constituents deposited on said polygons using said polygon area, quantity data and analysis data thereby tracking sewage sludge deposited on the plots.

2. The method as set forth in claim 1, said computer including means for presenting a display, said method further including the steps of storing in said computer memory a graphical illustration of the plot and selectively displaying said illustration.

3. The method as set forth in claim 2, further including the step of storing said graphical illustration as a portion of a topographic map.

4. The method as set forth in claim 2, further including the step of storing said graphical illustration as a portion of a digitized photographic image.

5. The method as set forth in claim 2, further including the steps of storing said graphical illustration as a portion of a topographic map and of a digitized photographic image and displaying said map and photograph in superposed relationship.

6. The method as set forth in claim 1, said computer including means for presenting a display, said method further including the steps of
    storing in said computer memory a graphical illustration of at least a portion of the plot and selectively displaying said illustration,
    storing in said computer memory textual data concerning said plot, and
    providing a computer program interface between said illustration and textual data allowing at least one of retrieval of said illustration in response to retrieval from said memory of selected portions of said textual data, and retrieval from said memory of said textual data in response to retrieval of said illustration.

7. The method as set forth in claim 1, further including the steps of storing in said computer memory textual data concerning said plot.

8. The method as set forth in claim 7, further including the step of storing said plot area, quantity data and analysis as part of said textual data.

9. The method as set forth in claim 1, further including the steps of identifying a plurality of points about said respective plot boundaries and identifying said points as corner points of said respective plot boundaries.

10. The method as set forth in claim 1, the sewage sludge being deposited on each of the plots in loads of sewage sludge, said analysis data including the percent of solids in the sewage sludge each of said loads.

11. The method as set forth in claim 1, further including the step of producing an output from said computer as a report representative of said cumulative amount.

12. The method as set forth in claim 1, using a personal computer as said computer.

13. The method as set forth in claim 1, further including the step of repeating step (e) for successive quantities of sewage sludge deposited on the plots.

14. The method as set forth in claim 1, step (a) including the steps of
    identifying a plurality of points about the boundaries of said plots,
    at said boundary points, receiving global positioning signals in a receiver and, in response, determining in said receiver the coordinates of each of said points, and
    storing said coordinates in said memory as part of said boundary information.

15. The method as set forth in claim 1, step (a) including the step of storing said boundary information for plots defined in subsequent seasons.

16. A sewage sludge tracking apparatus for tracking the intentional depositing of vehicle-transported sewage sludge on plots of land comprising:
    a computer; and
    computer memory coupled with said computer, said memory including boundary information identifying the respective plot boundaries of a plurality of plots of land,
    said computer including means for
        determining a plurality of polygons defined by the superposition of said plot boundaries so that each of said plots includes at least one of said polygons and so that, if one of said plots overlaps another of said plots, then said one of said plots includes at least two of said polygons, and
        determining the area of each of said polygons using said boundary information,
    said computer memory including quantity data representative of the quantity of sewage sludge deposited on said plots and analysis data representative of selected constituents including at least one of metals and nutrients of the sewage sludge deposited on said plots,
    said computer including means for determining the cumulative quantity per unit area of said constituents deposited on said polygons using said polygon area, quantity data and analysis data thereby tracking sewage sludge deposited on the plots.

17. The apparatus as set forth in claim 16, further including a global positioning receiver operable for receiving signals from global positioning satellites and for determining land coordinates therefrom, said computer memory including means for receiving and storing inputs as land coordinates produced by said receiver, said boundary information including said land coordinates.

18. The apparatus as set forth in claim 16, said memory including display data representative of said plots, said computer including means for displaying a graphical illustration of said plots.

19. The apparatus as set forth in claim 18, said graphical illustration being included as a portion of a topographic map.

20. The apparatus as set forth in claim 18, said graphical illustration being a portion of a digitized photographic image.

21. The apparatus as set forth in claim 18, said graphical illustration being a portion of a topographic map and of a digitized photographic image, said computer including means for displaying said map and photographic image in superposed relationship.

22. The apparatus as set forth in claim 16, said memory including data representative of a graphical illustration of at least a portion of said plots and representative of textual data concerning said plots, said computer including means for retrieving said illustration in response to retrieval of selected portions of said textual data, and for retrieving said textual data in response to retrieval of said illustration.

23. The apparatus as set forth in claim 16, said computer including a personal computer.

24. A method of tracking the intentional depositing of vehicle-transported sewage sludge on plots of land comprising the steps of:
   (a) storing in the memory of a computer boundary information identifying the respective plot boundaries of a plurality of plots of land, and setback information representative of any setback locations in the vicinity of said plots;
   (b) using said setback information and said boundary information in said computer for modifying said plot boundaries according to said setback locations and for determining a plurality of polygons defined by the superposition of said modified plot boundaries so that each of said plots includes at least one of said polygons and, so that, if one of said plots overlaps another of said plots, then said one of said plots includes at least two of said polygons;
   (c) determining in said computer the area of each of said polygons using said boundary information;
   (d) storing in said computer memory quantity data representative of the quantity of sewage sludge deposited on said plots and analysis data representative of selected constituents including at least one of metals and nutrients of the sewage sludge deposited on said plots; and
   (e) determining in said computer the cumulative quantity per unit area of said constituents deposited on said polygons using said polygon area, quantity data and analysis data thereby tracking sewage sludge deposited on the plots.

25. The method as set forth in claim 24, said setback location including a well, the boundary of said setback area being defined by a circle surrounding said well.

26. The method as set forth in claim 24, said setback location including a stream, the boundary of said setback area being defined by a line generally parallel to the stream at a predetermined distance.

27. The method as set forth in claim 24, said computer including means for presenting a display, said method further including the steps of storing in said computer memory a graphical illustration of the plot and selectively displaying said illustration.

28. The method as set forth in claim 27 further including the step of storing said graphical illustration as a portion of a topographic map.

29. The method as set forth in claim 27 further including the step of storing said graphical illustration as a portion of a digitized photographic image.

30. The method as set forth in claim 27 further including the steps of storing said graphical illustration as a portion of a topographic map and of a digitized photographic image and displaying said map and photograph in superposed relationship.

31. The method as set forth in claim 24, said computer including means for presenting a display, said method further including the steps of
   storing in said computer memory a graphical illustration of at least a portion of the plot and selectively displaying said illustration,
   storing in said computer memory textual data concerning said plot, and
   providing a computer program interface between said illustration and textual data allowing at least one of retrieval of said illustration in response to retrieval from said memory of selected portions of said textual data, and retrieval from said memory of said textual data in response to retrieval of said illustration.

32. The method as set forth in claim 24 further including steps of storing in said computer memory textual data concerning said plot.

33. The method as set forth in claim 24 further including the step of storing said plot area, quantity data and analysis as part of said textual data.

34. The method as set forth in claim 24, further including the steps of identifying a plurality of points about said respective plot boundaries and identifying said points as corner points of said respective plot boundaries.

35. The method as set forth in claim 24 further including the steps of performing said steps for waste matter including biosolids.

36. The method as set forth in claim 24, the sewage sludge being deposited on each of the plots in the loads of sewage sludge, said analysis data including the percent of solids in the sewage sludge of each of said loads.

37. The method as set forth in claim 24 further including the step of producing an output from said computer as a report representative of said cumulative amount.

38. The method as set forth in claim 24 further including the step of using a personal computer as said computer.

39. The method as set forth in claim 24 further including the step of repeating steps (d) and (e) for successive quantities of waste matter deposited on the plots.

40. A sewage sludge tracking apparatus for tracking the intentional depositing of vehicle-transported sewage sludge on plots of land comprising:
   a computer; and
   computer memory coupled with said computer, said memory including boundary information identifying the respective plot boundaries of a plurality of plots of land and setback information representative of any setback locations in the vicinity of said plots;
   said computer including means for
      modifying said plot boundaries according to said setback locations and for determining a plurality of polygons defined by the superposition of said modified plot boundaries so that each of said plots includes at least one of said polygons and so that, if one of said plots overlaps another of said plots, then said one of said plots includes at least two of said polygons, and determining the area of each of said polygons using said boundary information, said computer memory including quantity data representative of the quantity of sewage sludge deposited on said plots and analysis data representative of selected constituents including at least one of metals and nutrients of the sewage sludge deposited on said plots, said computer including means for determining the cumulative quantity per unit area of said constituents deposited on said polygons using said polygon area, quantity data and analysis data thereby tracking sewage sludge deposited on the plots.

* * * * *